(12) United States Patent
Franckart et al.

(10) Patent No.: US 7,336,223 B2
(45) Date of Patent: Feb. 26, 2008

(54) SYSTEM AND METHOD FOR ESTABLISHING THE INSTANTANEOUS SPEED OF AN OBJECT

(75) Inventors: Jean-Pierre Franckart, Montignies-sur-Sambre (BE); Mauro Bortolotto, Chatelineau (BE)

(73) Assignee: Alstom Belgium S.A., Charleroi (BE)

( * ) Notice: Subject to any disclaimer, the term of this patent is extended or adjusted under 35 U.S.C. 154(b) by 0 days.

(21) Appl. No.: 11/402,037

(22) Filed: Apr. 11, 2006

(65) Prior Publication Data

US 2006/0234699 A1    Oct. 19, 2006

(30) Foreign Application Priority Data

Apr. 15, 2005    (FR) .................................. 05 03803

(51) Int. Cl.
*G01S 1/02* (2006.01)

(52) U.S. Cl. .................................. 342/357.05; 342/104

(58) Field of Classification Search ................ 342/104, 342/402, 357.01, 357.05, 357.06; 455/427
See application file for complete search history.

(56) References Cited

U.S. PATENT DOCUMENTS

| | | | |
|---|---|---|---|
| 4,402,049 A * | 8/1983 | Gray ........................... | 701/205 |
| 4,405,986 A | 9/1983 | Gray | |
| 5,561,641 A * | 10/1996 | Nishimori et al. ............. | 367/90 |
| 5,870,053 A * | 2/1999 | Chamouard et al. ....... | 342/25 A |
| 5,977,909 A | 11/1999 | Harrison et al. | |
| 5,978,735 A | 11/1999 | Gu | |
| 6,292,132 B1 | 9/2001 | Wilson | |
| 6,768,447 B2 | 7/2004 | Franckart | |
| 2002/0173269 A1* | 11/2002 | Grayson et al. ........... | 455/12.1 |
| 2003/0093248 A1* | 5/2003 | Vock et al. .................. | 702/188 |

FOREIGN PATENT DOCUMENTS

WO        WO 02/03094        1/2002

* cited by examiner

*Primary Examiner*—Dao Phan
(74) *Attorney, Agent, or Firm*—Davidson, Davidson & Kappel, LLC

(57) ABSTRACT

A system for establishing the speed, in a safe manner, of an object (1) which is travelling along a known trajectory, including a device (3, 7) for locating the object and direction of its movement, a receiver (6) for receiving a signal from a plurality of satellites (4, 5) and processing units. For each satellite, a processing unit (8) includes a frequency meter for measuring the frequency shift of the signal received relative to the frequency of the signal transmitted, a device for establishing the vectorial difference of the speeds of the object and the satellite by calculating the Doppler effect and, a calculator of the speed in the movement direction of the object. The measurements of the frequency shift are repeated independently on signals from a plurality of satellites, and the results obtained are combined in order to obtain a speed with the desired level of safety.

7 Claims, 2 Drawing Sheets

SYSTEM AND METHOD FOR ESTABLISHING THE INSTANTANEOUS SPEED OF AN OBJECT

BACKGROUND

The present invention relates to a system and a method for establishing the instantaneous speed in a safe manner of an object which is travelling along a known trajectory, in particular a vehicle such as a train.

Patent application WO 02/03094 filed on 29 Jun. 2001 describes a system for locating an object in a safe manner, such as a train, based on the transmissions of signals carried out by a group of GNSS (Global Navigation Satellite System) satellites.

In the context of railways, safe location is understood in the sense of the standard Cenelec 50129. It relates to providing a location interval with an extremely low probability (from $10^{-09}$ to $10^{-12}$) that the train can be outside that interval.

With regard to establishing the instantaneous speed, prior systems conventionally based on electromechanical devices have the disadvantage of being extremely costly. In order to improve safety, they use a combination of sensors which detect axle rotation and which have to withstand accelerations greater then 90 g, single-axle accelerometers and on-board radar systems.

Therefore, the object of the invention is to provide a system for establishing the instantaneous speed having the level of safety required by railways at a cost far lower than existing systems.

Therefore, the invention relates to a system for establishing the instantaneous speed in a safe manner of an object which is travelling along a known trajectory, in particular a vehicle such as a train, the system comprising:

means for approximately locating the object and direction of its movement, and means for receiving at least one signal transmitted at a predetermined frequency, known to the object, from at least one satellite and means for calculating and analyzing the signal comprising:

means for measuring the frequency shift of the signal received relative to the predetermined frequency of the signal transmitted, which means are connected to means for establishing the vectorial difference of the speeds of the object and the satellite in the satellite/object direction by calculating the Doppler effect which has generated the frequency shift and means for calculating the instantaneous speed in the direction of movement of the object based on the vectorial difference established previously. The measurements of the frequency shift and the associated calculations are repeated independently on signals from at least two different satellites and the calculation and analysis means further comprise means for combining the results obtained independently in order to obtain an instantaneous speed with the desired level of safety.

Other features of the invention are:

the means for calculating and analyzing the signal for the object are adapted to establish the frequency shift owing to the Doppler effect of two signals, each being from two separate satellites, the means for establishing the instantaneous speed of the object being adapted to establish that speed based on the frequency shift of the two signals;

it uses the signals from four satellites, the combination means using the instantaneous speeds obtained by the calculation means based on six pairs of satellites, each satellite belonging to at least one pair;

the means for calculating and analyzing the signal further comprise stable time reference means, the means for establishing the instantaneous speed of the object being adapted to establish that speed based on the frequency shift owing to the Doppler effect of a single signal from a single satellite;

it uses the signals from three satellites; and it comprises means for receiving the signal which are located at two separate points of that object and which are capable of simultaneously receiving the signal at those two points, the receiving means being connected to means for calculating the path travelled by the signal which are capable of establishing that the signal has reached the two points of the receiving means via different paths and removing, for a predetermined period of time, the satellite which transmitted that signal, from the list of satellites for which the speed calculations previously defined are authorised.

The invention further relates to a method for establishing the instantaneous speed of an object which is travelling along a known trajectory, which method comprises the steps of:

establishing the approximate location and movement direction of the object, receiving at least one signal transmitted at a predetermined frequency, known to the object, from at least one satellite, measuring the frequency of the signal received by the object, measuring the frequency shift of the signal received relative to the predetermined frequency of the signal transmitted, establishing the vectorial difference of the speeds of the object and the satellite in the satellite/object direction by calculating the Doppler effect which has generated the frequency shift, and calculating the instantaneous speed of the object in the movement direction of the object based on the instantaneous speed established previously.

BRIEF DESCRIPTION OF THE DRAWINGS

The invention will be better understood from a reading of the following description given purely by way of example and with reference to the drawings, in which.

DETAILED DESCRIPTION

Figure 1:
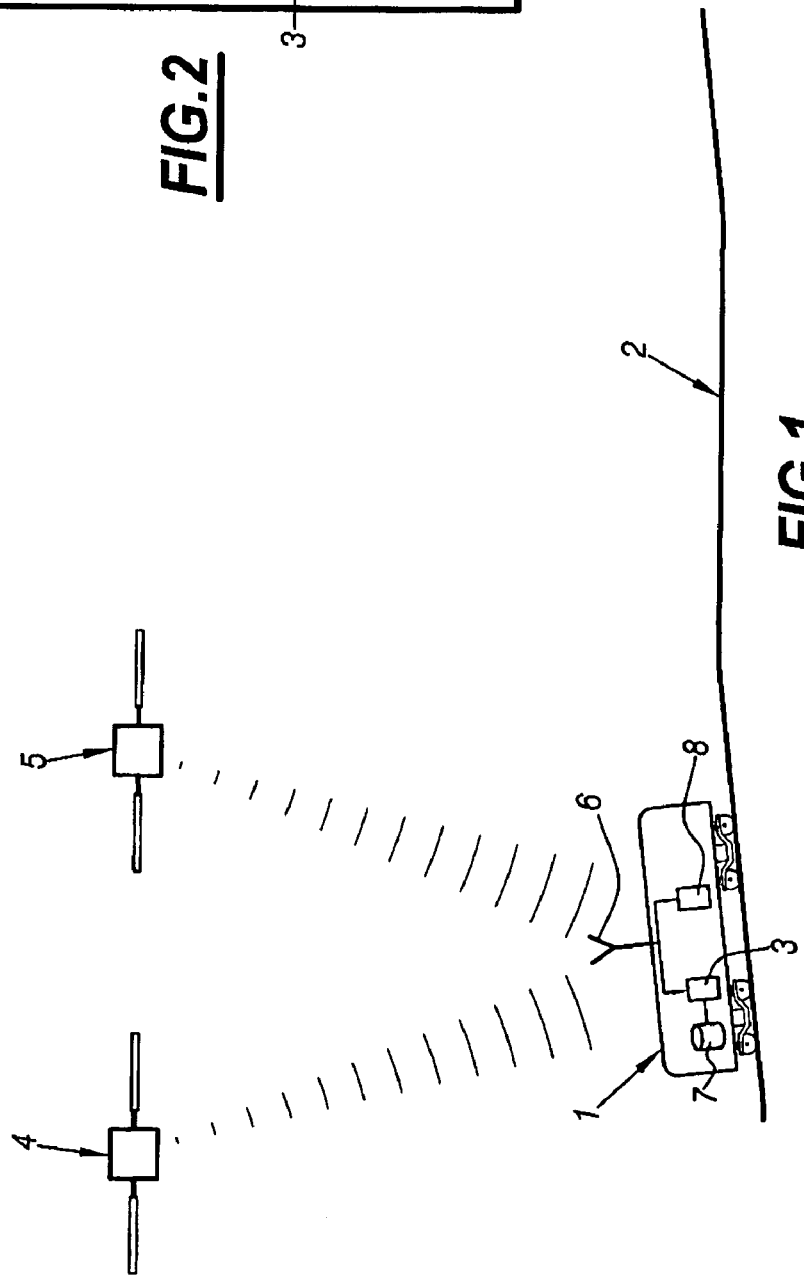
FIG. 1 is a schematic drawing of a preferred embodiment of the invention.

The system for establishing the instantaneous speed is described with reference to FIG. 1.

Let 1 designate an object which will be supposed to be a train, by way of example, which is travelling along a known trajectory 2.

It comprises location means 3 of the same type as those described in application PCT WO 02/03094 which are therefore capable of establishing, in a safe manner, the position of the train 1 on the track based on signals from a group of GNSS satellites 4, 5 and maps of the network on which the train is travelling.

The train 1 is provided with means 6 for receiving signals transmitted by those satellites 4, 5. Those receiving means 6 comprise antennae and electronic modules which operate at superhigh frequency, as is well known to the person skilled in the art, and which are connected to the location means 3 in order to provide them with the signals from the satellites 4, 5.

The location means 3 are connected to a database 7 of maps of the rail network. That database conventionally depicts the tracks in the form of a succession of straight-line segments, each end of which is expressed using the WGS84 co-ordinate system of the GNSS system.

As explained in patent application WO 02/03094, those location means 3 provide a location interval of the train with a probability of less than $10^{-9}$ that the train can be outside that interval.

That location interval allows the movement direction to be established.

In accordance with the path of the track, the movement direction is corrupted by a variable angular imprecision. That imprecision is linked to two factors:

the imprecision of the map database because, as indicated above, the track is modelled in the form of a succession of straight-line segments; and the imprecision linked to location. If the location interval corresponds to a rectilinear section of track, then the direction is known correctly. If the track section is curved, however, then the location interval may cover a plurality of straight-line segments having different directions.

The signal received from the satellites 4, 5 by the receiving means 6 is also transferred to means 8 for calculating and analyzing that signal.

Figure 2:
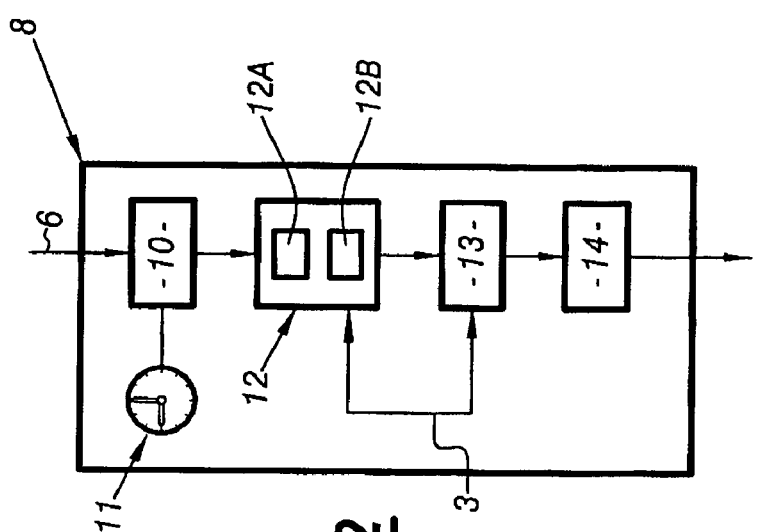
FIG. 2 is a schematic drawing of the means for calculating and analyzing the signal.

They comprise (FIG. 2) means 10 for measuring the frequency shift of the signal received, for each satellite, with reference to an internal atomic clock 11. That frequency shift is due to the Doppler effect brought about by the relative speeds of the train 1 and the satellite.

Therefore, these measurement means 10 are connected to means 12 for establishing the vectorial difference of the speeds of the train and the satellite in the satellite/object direction by calculating the Doppler effect which has generated the frequency shift, which means 12 are themselves connected to means 13 for calculating the instantaneous speed in the direction of movement of the object based on the instantaneous speed established previously.

Figure 3:
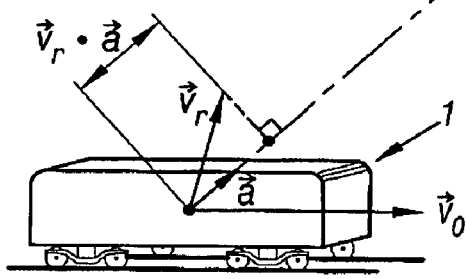
FIG. 3 is an illustration of the composition of the speeds.

The frequency shift is generated by the Doppler effect according to the formula:

i. $f_R = f_T \left(1 - \dfrac{\vec{v}_r \cdot \vec{a}}{c}\right)$ (1)

ii. where $f_R$ is the frequency of the signal received, $f_T$ is the frequency of the signal transmitted by the satellite, $\vec{v}_r$ is the vector for the satellite/object relative speed, FIG. 3, $\vec{a}$ is the unit vector directed along the line from the object to the satellite, referred to as the line of sight, and c is the speed of light.

iii. The product $\vec{v}_r \cdot \vec{a}$ corresponds to the projection of the relative speed vector on the line of sight of the satellite.

iv. The vector $\vec{v}_r$ of the relative speed corresponds to the difference between the speed vector of the satellite $\vec{v}_s$ and the speed vector of the object $\vec{v}_o$:

v. $\vec{v}_r = \vec{v}_s - \vec{v}_o$ (2)

The means 12 for establishing the vectorial difference of the speeds comprise means 12A for calculating the speed $\vec{v}_s$ of the satellite using ephemerid data and the orbital model of the satellite, which data are downloaded from the satellites during a preceding step.

They also comprise means 12B for calculating the unit vector $\vec{a}$ of the line of sight from the position of the object and the position of the satellite.

The means 12 for establishing the vectorial difference of the speeds of the train 1 and the satellite in the satellite/object direction, that is to say, $(\vec{v}_s - \vec{v}_o) \cdot \vec{a}$, calculate it in accordance with the equation:

i. $\Delta f = f_R - f_T = -f_T \dfrac{(\vec{v}_s - \vec{v}_o) \cdot \vec{a}}{c}$ (3)

which is deduced from equations (1) and (2).

The means 13 for calculating the instantaneous speed of the train in accordance with the movement direction thereof are brought about based on the instantaneous speed of the object in the satellite/object direction established previously, that is to say, $\vec{v}_o \cdot \vec{a}$, and the value of the vector $\vec{a}$ expressed in the local reference system of the track (where the speed of the train has a unique component along the track).

These measurements and calculations are repeated for a plurality of different satellites independently. The combination of the results obtained carried out by means 14 then allows a confidence interval to be established for the speed with a low probability (from $10^{-09}$ to $10^{-12}$) of the speed being outside the interval.

In this manner, three measurements from three different satellites, each carried out with a confidence interval having an error probability of from $10^{-5}$ to $10^{-6}$, allow, at the first attempt, because they are independent measurements, a confidence interval to be obtained with a probability better than $10^{-15}$ In fact, it appeared that, owing to given errors, the probability obtained with three satellites is only in the order of $10^{-12}$.

The measurements carried out by the means 11 for measuring the frequency shift are corrupted by a given number of errors, such as the shift rate $\delta t_o$ of the clock of the receiver relative to the time of the system, the time shift rate $\delta t_D$ owing to atmospheric phenomena, the noise of the receiver, . . . and the shift rate $\delta t_s$ of the clock of the satellite relative to the time of the system.

Should the train be provided with an atomic clock, as described above, the shift rate $\delta t_o$ of the clock of the receiver may be considered to be negligible.

However, since an atomic clock is a relatively costly piece of equipment, it is particularly advantageous to have a system which does not require its use and which therefore allows the effect $\dot{\delta}t_o$ to be compensated for.

By expressing that frequency shift measurement in the form of a temporal variation of distance, that is to say, by multiplying the frequency shift owing to the Doppler effect by the wavelength of the signal, the temporal variation of the train/satellite distance measured $\dot{\rho}$ (in English "pseudo range-rate") is such that:

$$\dot{\rho} = \dot{R} + c\dot{\delta}t_o - c\dot{\delta}t_s + c\dot{\delta}t_D \quad (4)$$

where $\dot{R}$ is the temporal variation of the geometric train/satellite distance (in English "geometric range rate").

Given that the shift rate of the clock of the satellite, derived from the navigation message of the satellite, is expressed as a constant referred to as $af_1$, then $\dot{\rho} = \dot{R} + c\dot{\delta}t_o - caf_1 + c\dot{\delta}t_D$ \quad (5).

By expressing the equation (3) in order to arrive at the temporal variation of distance, $$\dot{R} = -\lambda_T \Delta f = \lambda_T f_T \frac{(\vec{v_s} - \vec{v_O}) \cdot \vec{a}}{c} = c\frac{(\vec{v_s} - \vec{v_O}) \cdot \vec{a}}{c} = (\vec{v_s} - \vec{v_O}) \cdot \vec{a}. \quad (6)$$

By definition, that temporal variation of distance is equal to $-\lambda \cdot$Doppler.

Thus, the temporal variation of distance measured $\dot{\rho}$ is expressed as the negative product of the wavelength of the signal multiplied by the Doppler effect established by the receiver ($L_1$Doppler), $\dot{\rho} = -\lambda_T \cdot L_1$ doppler.

Combining the equations (5) and (6) thus gives:

$$\vec{v}_o \cdot \vec{a} = \vec{v}_s \cdot \vec{a} + \lambda_T L_1 \text{doppler} + c\dot{\delta}t_o - caf_1 + c\dot{\delta}_D \quad (7).$$

Using the signals from two satellites $s_1$ and $s_2$, and combining the corresponding equations (7), there is obtained:

$$\vec{v}_o \cdot (\vec{a}_{s2} - \vec{a}_{s1}) = \vec{v}_{s2} \cdot \vec{a}_{s2} - \vec{v}_{s1} \cdot \vec{a}_{s1} + \lambda_T(L_1 \text{Doppler}_{s2} - L_1 \text{Doppler}_{s1}) - c(af_1^{s2} - af_1^{s1}) + c(\dot{\delta}t_{DS2} - \dot{\delta}t_{DS1}).$$

The shift rate $\dot{\delta}t_o$ from the receiving clock is eliminated.

Thus, the means 12 for calculating the vectorial difference use the relative frequency shift owing to the Doppler effect of two signals from each of two separate satellites in order to eliminate the shift linked to the receiving clock, thus avoiding the use of a precision clock, such as an atomic clock, on the train 1.

In order to obtain the necessary precision for establishing the speed in a safe manner, however, the measurements carried out with the signals of at least three satellites are necessary when an atomic clock is used, as explained above.

In order to obtain the same degree of precision without using an atomic clock and, therefore, using the calculations relating to two satellites explained above, it is necessary to use a group of at least four satellites, therefore forming six different pairs, in order to have the equivalent of three pairs of independent measurements.

The method for establishing the instantaneous speed of an object travelling along a known trajectory comprises the steps of:

establishing the approximate location and movement direction of the object, receiving at least one signal transmitted at a predetermined frequency, known to the object, from at least one satellite, measuring the frequency of the signal received by the object, measuring the frequency shift of the signal received relative to the predetermined frequency of the signal transmitted, establishing the vectorial difference of the speeds of the object and the satellite in the satellite/object direction by calculating the Doppler effect which has generated the frequency shift and calculating the instantaneous speed of the object in the movement direction of the object based on the instantaneous speed established previously.

All the above calculations have been carried out supposing that the signal follows a direct path between the satellite and the train.

It is well known that waves can be reflected from some surfaces and that it is therefore possible for the train to receive a reflected signal in place of the direct signal.

It will be appreciated that that leads to an additional level of error, falsifying the frequency shift of the signal received.

That "alternative path" phenomenon occurs only in a specific environment, such as travel through an urban zone.

A means of eliminating the signals arising from "alternative path" consists in installing two antennae at separate points of the train, typically approximately twenty metres from each other.

By carrying out a measurement of the Doppler effect on the signals received simultaneously at each antenna, it is established as to whether that measurement is different or not.

If it is different, that means that the signal received by one of the two antennae is from an "alternative path".

Figure 4:
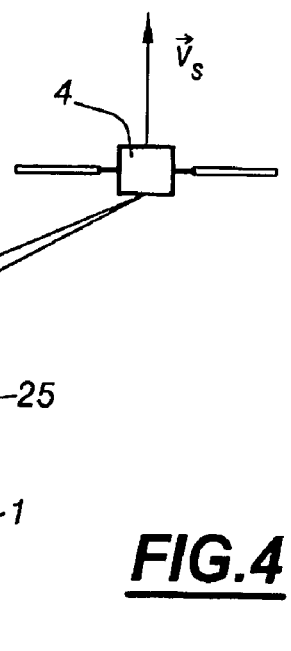
FIG. 4 is a schematic drawing of a construction variant of the invention.

In FIG. 4, the train 1 continues and enters, for example, a zone in which a building 25 is located. At that moment, the antenna 20 no longer captures the direct signal from the satellite 4, unlike the antenna 21, but instead a signal reflected by that building 25.

A few moments later, the train having continued, the second antenna 21 enters the zone of the building 25 in turn.

At that moment, since the two antennae capture the same signal reflected by the building 25, the measurement means no longer detect any difference between the two signals.

Consequently, a time delay is provided in the form of a delay and a distance travelled, during which the signal from the satellite 4 is not used, and that time delay is re-initialised every time a divergence is observed. The satellite 4 in the example will therefore be re-used only after a given period of coherent measurement has been observed and/or the train has travelled a given distance without any divergence being observed. Other conditions may be associated therewith.

Therefore, the system and the method described in this manner advantageously allow the speed of a train to be established with the levels of safety required. Therefore, it is far less costly than prior systems because it does not use any mechanical component or components subjected to powerful environmental constraints.

The invention claimed is:

1. System for establishing the instantaneous speed, in a safe manner, of an object (1) which is travelling along a known trajectory, in particular a vehicle such as a train, the system comprising:

means (3, 7) for approximately locating the object and direction of its movement, and means (6) for receiving at least one signal transmitted at a predetermined frequency, known to the object, from at least one satellite (4, 5) and means (8) for calculating and analyzing the signal comprising:

means (10) for measuring the frequency shift of the signal received relative to the predetermined frequency of the signal transmitted, which means (10) are connected to means (12) for establishing the vectorial difference of the speeds of the object and the satellite in the satellite/object direction by calculating the Doppler effect which has generated the frequency shift and means (13) for calculating the instantaneous speed in the movement direction of the object based on the vectorial difference established previously, characterized in that the measurements of the frequency shift and the associated calculations are repeated independently on signals from at least two different satellites, and in that the calculation and analysis means (8) further comprise means (14) for combining the results obtained independently in order to obtain an instantaneous speed with the desired level of safety.

2. System for establishing the instantaneous speed of an object according to claim 1, characterized in that the means (8) for calculating and analyzing the signal for the object are adapted to establish the frequency shift resulting from the Doppler effect of two signals, each being from two separate satellites (4, 5), the means (13) for establishing the instantaneous speed of the object being adapted to establish that speed based on the frequency shift of the two signals.

3. System for establishing the instantaneous speed of an object according to claim 2, characterized in that it uses the signals from four satellites, the combination means (14) using the instantaneous speeds obtained by the calculation means (13) based on six pairs of satellites, each satellite belonging to at least one pair.

4. System for establishing the speed of an object according to claim 1, characterized in that the means for calculating and analyzing the signal further comprise stable time reference means, the means for establishing the instantaneous speed of the object being adapted to establish that speed based on the frequency shift resulting from the Doppler effect of a single signal from a single satellite.

5. System for establishing the speed of an object according to claim 4, characterized in that it uses the signals from three satellites.

6. System for establishing the instantaneous speed of an object according to claim 1, characterized in that it comprises means for receiving the signal which are located at two separate points of that object and which are capable of simultaneously receiving the signal at those two points, the receiving means being connected to means for calculating the path travelled by the signal which are capable of establishing that the signal has reached the two points of the receiving means via different paths and removing, for a predetermined period of time, the satellite which transmitted that signal, from the list of satellites for which the speed calculations previously defined are authorised.

7. Method for establishing the instantaneous speed of an object which is travelling along a known trajectory, comprising the steps of:

establishing the approximate location and movement direction of the object, receiving at least one signal transmitted at a predetermined frequency, known to the object, from at least one satellite, measuring the frequency of the signal received by the object, measuring the frequency shift of the signal received relative to the predetermined frequency of the signal transmitted, establishing vectorial difference of the speeds of the object and the satellite in the satellite/object direction by calculating the Doppler effect which has generated the frequency shift and calculating the instantaneous speed of the object in the movement direction of the object based on the vectorial difference established previously.

\* \* \* \* \*

UNITED STATES PATENT AND TRADEMARK OFFICE
CERTIFICATE OF CORRECTION

PATENT NO. : 7,336,223 B2
APPLICATION NO. : 11/402037
DATED : February 26, 2008
INVENTOR(S) : Jean-Pierre Franckart and Mauro Bortolotto It is certified that error appears in the above-identified patent and that said Letters Patent is hereby corrected as shown below:

Column 5, line 17, equation (5) should read:

$$\dot{\rho} = \dot{R} + c\dot{\delta t}_o - caf_1 + c\dot{\delta t}_D$$

instead of $$\dot{\rho} = \dot{R} + c\dot{\delta t}_o caf_1 + c\dot{\delta t}_D$$

Signed and Sealed this

Twenty-fourth Day of June, 2008

JON W. DUDAS
*Director of the United States Patent and Trademark Office*